US012677728B2

(12) United States Patent
Abeles

(10) Patent No.: US 12,677,728 B2
(45) Date of Patent: Jul. 14, 2026

(54) GROUND PENETRATING SELF-DRILLING AND SELF-HYDRATING SEED PLANTING CLUSTER

(71) Applicant: VIRIDIS ARBOR LLC, Verona, NJ (US)

(72) Inventor: Gary E. Abeles, Verona, NJ (US)

(73) Assignee: VIRIDIS ARBOR LLC, Verona, NJ (US)

( * ) Notice: Subject to any disclaimer, the term of this patent is extended or adjusted under 35 U.S.C. 154(b) by 0 days.

(21) Appl. No.: 19/452,696

(22) Filed: Jan. 19, 2026

(65) Prior Publication Data

US 2026/0150779 A1 Jun. 4, 2026

Related U.S. Application Data

(63) Continuation-in-part of application No. 19/222,429, filed on May 29, 2025, now Pat. No. 12,550,810.

(60) Provisional application No. 63/660,780, filed on Jun. 17, 2024.

(51) Int. Cl.
*A01C 7/20* (2006.01)
*A01G 9/029* (2018.01)

(52) U.S. Cl.
CPC .............. *A01C 7/20* (2013.01); *A01G 9/0295* (2018.02)

(58) Field of Classification Search
CPC .. A01C 7/00; A01C 7/20; A01C 21/00; A01G 9/0295
USPC ......................................................... 111/170
See application file for complete search history.

(56) References Cited

U.S. PATENT DOCUMENTS

| | | | | |
|---|---|---|---|---|
| 3,273,284 A | * | 9/1966 | Anagnostou | ......... A01G 9/0291 47/74 |
| 3,755,962 A | * | 9/1973 | Walters et al. | ......... F42B 25/00 102/385 |
| 4,333,265 A | * | 6/1982 | Arnold | ..................... B64D 1/10 221/92 |
| 4,347,686 A | * | 9/1982 | Wood | ................... A01G 9/0291 47/73 |

(Continued)

FOREIGN PATENT DOCUMENTS

KR 20140068414 A * 6/2014 ........... A01G 9/0293

OTHER PUBLICATIONS

Kim et al., Screw Type Seedling Pot (KR-20140068414-A), all pages, machine translation. (Year: 2014).*

*Primary Examiner* — Tara Mayo
(74) *Attorney, Agent, or Firm* — Maine Cernota & Curran

(57) ABSTRACT

A seed planting cluster includes a seeding tapered projectile bonded to a hydrating tapered projectile. The hydrating projectile contains water that is released into the ground upon impact through hydrating holes that are initially covered by water-soluble seals. The seeding projectile contains a seed carrier helix that expands downward when exposed to the water, thereby inserting at least one seed, seedling, and/or sapling into the ground. The cluster is dropped or ballistically propelled downward from an aircraft, whereupon the projectiles penetrate into the ground and, if present, through a hydroscopic layer. The seeding projectile bottom can be open, or capped with a hard, water-soluble material. The top of the seeding projectile can be open, holes can be provided on the side of the seeding projectile, and/or water in a frangible container can be provided within the seeding projectile. The seeding and/or hydrating projectiles can include anchoring barbs.

20 Claims, 17 Drawing Sheets

(56)  References Cited

U.S. PATENT DOCUMENTS

| | | | |
|---|---|---|---|
| 6,782,656 B2 * | 8/2004 | Washburn ................ | A01C 1/04 |
| | | | 47/29.2 |
| 7,992,345 B2 * | 8/2011 | Chun ..................... | A01C 11/00 |
| | | | 47/73 |
| 10,383,291 B2 * | 8/2019 | Ruys et al. .......... | A01G 27/008 |
| 12,575,516 B2 * | 3/2026 | Hamim ................. | A01G 31/02 |
| 2019/0116719 A1 * | 4/2019 | Fletcher et al. ......... | B64D 1/16 |
| 2025/0169403 A1 * | 5/2025 | Springer et al. ..... | A01G 9/0295 |

\* cited by examiner

GROUND PENETRATING SELF-DRILLING AND SELF-HYDRATING SEED PLANTING CLUSTER

RELATED APPLICATIONS

This application is a continuation in part of U.S. patent application Ser. No. 19/222,429. filed on May 29, 2025. Application Ser. No. 19/222,429 claims the benefit of U.S. Provisional Application No. 63/660,780, filed Jun. 17, 2024. Both of these applications are herein incorporated by reference in their entirety for all purposes.

FIELD OF THE INVENTION

The invention relates to application of seeds and/or seedlings to a forest or other remote area that has been damaged by fire, drought, logging, pestilence, invasive species, or other causes, and more particularly, to aerial insertion of seeds and seedlings into remote forests and other remote wilderness areas that have been damaged, including damaged areas that are arid.

BACKGROUND OF THE INVENTION

Ecological recovery of a damaged wilderness area has always been challenging, especially in areas that are unpopulated, or only sparsely populated. Furthermore, recent trends in global climate change have resulted in consistently higher temperatures and persistent droughts in many areas, which in turn have increased the risks and the occurrences of major fires in wilderness and other sparsely populated areas. In particular, fifteen of the largest wildfires that have ever been recorded in the United States have occurred within the past ten years. In addition, there has been a significant rise in damage to wilderness vegetation due to disease, insect infestation, invasive species, and other causes. And, of course, forests have long been under attack by the logging industry.

Direct aerial seeding can be a practical, low cost, and responsive approach to restoring large, remote treatment areas. Seeds or seedlings can be deposited onto the remote area using airplanes, helicopters, balloons, or unmanned aerial vehicles (UAVs), sometimes referred to as "drones." Bare seeds can simply be dropped onto an area, or the seeds can be encapsulated into pods that also contain nutrients and water to help the seeds germinate. In some cases, germinated seedlings or saplings are dropped instead of seeds. It will be noted that all of the above are generically referred to herein simply as "seeds," unless otherwise stated or required by a specific context.

Unfortunately, after the seeds land on the ground, it may be difficult for them to germinate if the underlying soil is compacted or covered with ashes, invasive vegetation, or some other undesirable layer. For example, if the seeds are being dropped onto an area that has been damaged by fire, it can be almost impossible for the roots of germinated seedlings to reach underlying fertile soil and water.

With reference to FIG. 1A, during intense forest fires, a waxy substance derived from the burning plant material is formed. Initially created as a gas, this substance penetrates into the topsoil and then hardens, creating what is called a "hydrophobic layer" 102 above the underlying layer of normal soil 104. This hydrophobic layer 102 can be up to three inches thick, and is the main source of mudslides in regions that have experienced a forest fire, because it prevents rainwater from sinking into the ground and reaching the underlying soil 104 that would otherwise be able to absorb the water. A thin layer of ash 100 may be formed on top of the hydrophobic layer 102, but is insufficient for supporting new seedlings, and may simply be washed away by subsequent rains and mudslides.

In the aftermath of a forest fire, the roots of the new vegetation 106 that results from seeds dropped onto the burned-over ground have difficulty penetrating through the hard hydrophobic layer 102, which means that, typically, the roots will be mainly on the surface of the ground above the hydrophobic layer 102. Most of the new vegetation 106 will therefore be poorly anchored to the ground and easily washed away.

As a result, huge volumes of seeds can be required to restore vegetation to a remote area at scale. Estimates suggest that reforesting around 25 million acres of lost and degraded forest in the western U.S. would require between 8 billion and 45 billion seeds. Accordingly, the availability of seeds can significantly limit the ability to restore a damaged wilderness area, and seed-use efficiency is tantamount to sustainable land-management practices.

The seed-use efficiency is even worse in arid regions, or in regions that receive rainfall heavily and sporadically, while receiving little rain in-between. In such cases, mudslides can be triggered by a sudden, heavy rainfall, and can wash away the seeds or seedlings before they have received sufficient moisture to germinate and stabilize the ground.

With reference to FIG. 1B, one approach that is disclosed in U.S. patent application Ser. No. 18/700,343, also by the present inventor and incorporated herein by reference in its entirety for all purposes, is to encapsulate the seeds 108 within pointed or otherwise tapered projectiles 110, possibly together with soil, water, and nutrients 112, and then drop or propel the projectiles 110 onto the damaged wilderness with sufficient kinetic energy to break through the hydrophobic layer 102 and/or other unfavorable layers covering the underlying soil. Nevertheless, it can be difficult to impart sufficient kinetic energy to the tapered projectiles to enable them to fully penetrate through the hydrophobic layer, especially if the soil is dry, compacted, and/or sandy.

With reference to FIG. 1C, another approach, which was recently introduced by researchers at Carnegie Mellon University, is to attach the seeds to or within the lower ends of autonomous, self-burying seed carriers 114, which emulate the action of Erodium seed carriers by self-drilling into the underlying soil. These "self-drilling" seed carriers 114 comprise dehydrated, tightly wound, tapered helixes 116 made from a material, such as white oak, that expands when it absorbs water. Each seed carrier 114 is topped with a spiral 118 having a much larger diameter, which helps to incline the tip of the helix 116 at an angle toward the ground. FIGS. 1D and 1E compare the lengths of the helix 116 in its dehydrated, tightly wound state 114A and its hydrated, unwound state 114B.

The strength and penetrating power of the helix can be increased by combining a plurality of "sub-helices" in parallel. For example, FIG. 1F is a perspective view of a self-drilling seed carrier 120 that includes a triple helix 122 and spiral 124. FIGS. 1G and 1H compare the lengths of the helix 122 in its dehydrated, tightly wound state 120A and its hydrated, unwound state 120B.

This self-drilling approach can be effective in penetrating soft soil. Otherwise, it can be difficult for the drilling process to be initiated, unless the tip of the seed carrier 114 fortuitously lands in a natural indentation or crevasse that can serve as a "pilot hole" for the expanding, rotating helix 116. Otherwise, if the ground is difficult to penetrate, or if the ground is covered by a hydrophobic layer 102, the expanding helix 116 will simply push the spiral 118 away from the ground, rather than drilling itself into the ground. As a result, these self-burying seed carriers often have a low success rate when applied under unfavorable conditions, such as after a forest fire.

It should be noted that, for ease of expression, the term "forest" is used generically herein to refer to any vegetated area that is a wilderness area, an otherwise unpopulated area, or a sparsely populated area, whether or not the vegetation is primarily trees, and the term "forest fire" is used generically herein to refer to any source of damage to a heavily vegetated area, including not only fire but also drought, disease, insect infestation, etc. The terms "trees" and "ground cover" are used herein to refer to any type of vegetation that is relatively large and relatively small, respectively. And the terms "seed" and "seeds" are used to refer to individual seed, seedlings, and saplings, as well as seeds, seedlings, or saplings packaged in a container or "pod," possibly together with nutrients and/or other support materials.

What is needed, therefore, is an apparatus and method for increasing the yield of seeds or seedlings that are aerially deposited onto a remote area, including regions that receive rainfall heavily and sporadically, while receiving little rain in-between.

SUMMARY OF THE INVENTION

The present invention is an apparatus and method for increasing the yield of seeds or seedlings that are aerially deposited onto a remote area, including regions that receive rainfall heavily and sporadically, while receiving little rain in-between.

According to the present invention, the one or more seeds or seedlings are attached to the distal end of a self-drilling seed carrier, which is positioned within a tapered projectile having a tip that is either open, or terminated by a water-soluble, pointed cap. The top of the seed carrier is either fixed to the tapered projectile, or otherwise prevented by internal structure from moving upward within the tapered projectile.

Upon striking the ground, the tapered projectile impacts in a substantially vertical orientation and penetrates into the underlying surface sufficiently far to anchor the tapered projectile to the ground, while providing a "pilot hole" for the seed carrier. The seed carrier is thereby able to initiate its drilling action, even if the ground is hard-packed or otherwise difficult to penetrate. If a hydrophobic layer is present, the tapered projectile penetrates through the hydrophobic layer into the underlying soil, allowing the seed carrier to drill into the soil and to deliver it's one or more seeds and/or seedlings below the hydrophobic layer. As the interior of the tapered projectile is exposed to water, the cap at the tip of the tapered projectile, if present, is dissolved, and the helix of the seed carrier expands, twisting and drilling itself further and deeper into the underlying layers.

Embodiments provide various mechanisms for hydration of the interior of the tapered projectile. In embodiments, water enters the tapered projectile through an open top thereof. Some embodiments include side openings through which ground water can easily penetrate.

For more arid environments, certain embodiments include a reservoir of water enclosed within the tapered projectile in a frangible hydration container that releases its contents onto the seed carrier upon impact of the tapered projectile with the ground.

In embodiments, the tapered projectile is a "seeding" tapered projectile that is included in a cluster together with one or more tapered "hydrating" projectiles, wherein the hydrating projectiles are filled primarily with water, either as a liquid and/or incorporated into a super-absorbent polymer "SAP." The seeding and hydrating projectiles in the cluster can be directly attached to each other, or attached together by "struts" which reduce the air resistance of the cluster.

The hydrating projectiles do not carry soil, seeds, or seedlings, but may carry fertilizer, either dissolved in the water or separately. Upon impact, all of the tapered projectiles penetrate into the ground and, if present, through the hygroscopic layer. Water is then released from the hydrating projectiles, thereby providing moisture for the one or more seeds or seedlings to germinate as they are projected downward from the seeding tapered projectile by the seed carrier. This approach ensures that the seeds or seedlings are able to germinate and stabilize the ground even during periods of low rainfall, so that mudslides are less likely to result from any heavy and sudden rainfalls that subsequently occur.

While the top of the seed carrier is illustrated and sometimes referred to herein as being a "spiral," it will be understood that the functionality of the seed carrier arises primarily from its helix, and not from its top, and that the top of the seed carrier can be an annulus, a disk, or any other construction that can be restrained from moving upward through the tapered projectile. Similarly, the tapered projectiles are illustrated and sometimes referred to herein as "cones." However, it will be understood that the tapered projectiles can take on any tapered shape, such as an inverted pyramid or hexagonal shape, and need not be conical. In embodiments, the cross-sectional shapes of one or more of the tapered containers is not uniform along the full length of the container.

A first general aspect of the present invention is a seed planting cluster that includes a hollow seeding tapered projectile having a top, a bottom, and a side, wherein a horizontal, cross-sectional area of the top is larger than a horizontal, cross-sectional area of the bottom, a seed carrier positioned within an interior of the seeding tapered projectile, the seed carrier comprising a helix extending downward from a carrier top of the seed carrier, the helix being substantially aligned with a seeding axis of the seeding tapered projectile, the helix being made from a material that expands when exposed to water, thereby at least partially unwinding the helix and increasing a length thereof, and one or more seeds, seedlings, and/or saplings contained within the tapered projectile and fixed to, or within, a lower portion of the helix.

The invention further includes a hollow hydrating tapered projectile fixed to the seeding tapered projectile, a horizontal, cross-sectional area of a top of the hydrating tapered projectile being larger than a horizontal, cross-sectional area of a bottom of the hydrating tapered projectile, hydrating water contained within a hydrating interior of the hydrating tapered projectile, and at least one hydrating hole proximate a bottom of the hydrating tapered projectile, the hydrating hole being covered by a water-soluble or frangible hydrating hole cover that is configured to be dissolved or ruptured after impact of the hydrating tapered projectile with underlying ground, thereby allowing the hydrating water to enter into the underlying ground that surrounds the hydrating tapered projectile.

The seed planning cluster is configured such that, upon an impact of the tapered projectiles with the underlying ground, the bottoms of the tapered projectiles are inserted into the ground, and the helix within the seeding tapered projectile is exposed to moisture released by the hydrating tapered projectile, thereby causing the length of the helix to be increased, such that the helix extends downward through the bottom of the seeding tapered projectile, and the one or more seeds, seedlings, and/or saplings are inserted into soil beneath the seeding tapered projectile.

In some embodiments, the hydrating tapered projectile is directed bonded to the seeding tapered projectile. In other embodiments, the hydrating tapered projectile is bonded to the seeding tapered projectile by a strut.

In any of the above embodiments, the hydrating tapered projectile can further contain fertilizer.

In any of the above embodiments, at least some of the water that is contained within the hydrating tapered projectile can be absorbed into a super-absorbent polymer (SAP).

In any of the above embodiments, the hydrating hole cover can comprises gelatin.

In any of the above embodiments, the hydrating tapered projectile can be included in a plurality of hydrating tapered projectiles, the seeding tapered projectile being symmetrically centered among the plurality of hydrating tapered containers.

In any of the above embodiments, the tapered projectile can be shaped as a cone, or as a frustum of a cone.

In any of the above embodiments, the bottom of the seeding tapered projectile can include a downward-facing opening through which the helix is able to extend as its length is increased. Or the bottom of the seeding tapered projectile can be a downwardly directed cap made from a water-soluble material.

In any of the above embodiments, the seeding tapered projectile can include at least one opening that penetrates the side of the seeding tapered projectile, thereby enabling moisture proximate the side of the seeding tapered projectile to enter into the interior of the seeding tapered projectile.

In any of the above embodiments, the seeding tapered projectile can further include water enclosed within a hydration container within the interior of the seeding tapered projectile, the hydration container being configured to release the water onto the helix upon impact of the seeding tapered projectile with the ground. In some of these embodiments, the hydration container is frangible, and configured to be broken open upon impact of the seeding tapered projectile with the ground. In some of these embodiments, the seeding tapered projectile further comprises a hammer configured to strike and break open the hydration container upon impact of the seeding tapered projectile with the ground.

Any of the above embodiments can further include at least one anchor extending outward from the seeding tapered projectile, the anchor being configured to readily penetrate into the ground, and thereafter to resist any upward dislodging of the seeding tapered projectile from the ground.

Any of the above embodiments can further include at least one of nutrients, soil, sand, gravel, fertilizer, and super-absorbent polymer (SAP) within the interior of the seeding tapered projectile.

A second general aspect of the present invention is a method of aerially applying seeds and/or seedlings to ground within a terrain. The method includes providing a seed planting cluster according to any embodiment of the first general aspect, and dropping or propelling the seed planting cluster from an aircraft toward the underlying ground, such that the bottoms of the seeding tapered projectile and the hydrating tapered projectile impact the ground according to an impact energy, the bottoms of the seeding tapered projectile and the hydrating tapered projectile penetrate into the underlying ground, the hydrating water contained within the hydrating tapered projectile is released into the underlying ground, the helix of the seed carrier positioned within the seeding tapered projectile is exposed to the hydrating water, the length of the helix is increased, the helix extends downward through the bottom of the seeding tapered projectile, and the one or more seeds, seedlings, and/or saplings that are fixed to or within a lower portion of the helix are inserted into soil beneath the seeding tapered projectile.

In some embodiments, the impact energy of the seed planting cluster is derived entirely from gravitational acceleration after being released from the aircraft. In other embodiments dropping or propelling the seed planting cluster from the aircraft can include ballistically propelling the seed planting cluster from the aircraft toward the forest floor.

And in any of the above embodiments, the impact energy can be sufficient to cause the seeding tapered projectile to penetrate a hydrophobic layer into underlying soil.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is an apparatus and method for increasing the yield of seeds or seedlings that are aerially deposited onto a remote area, including regions that receive rainfall heavily and sporadically, while receiving little rain in-between.

Figure 1A:
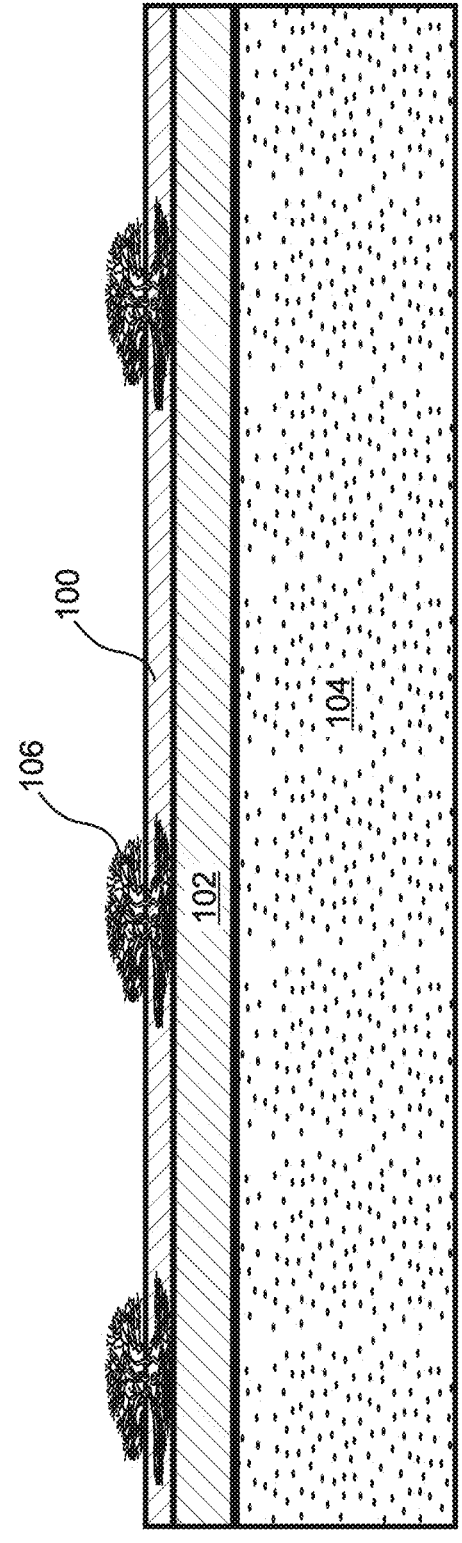
FIG. 1A is a cross-sectional view illustrating a layer of ash and newly germinated vegetation on top of an underlying hydrophobic layer according to the prior art.
Figure 1B:
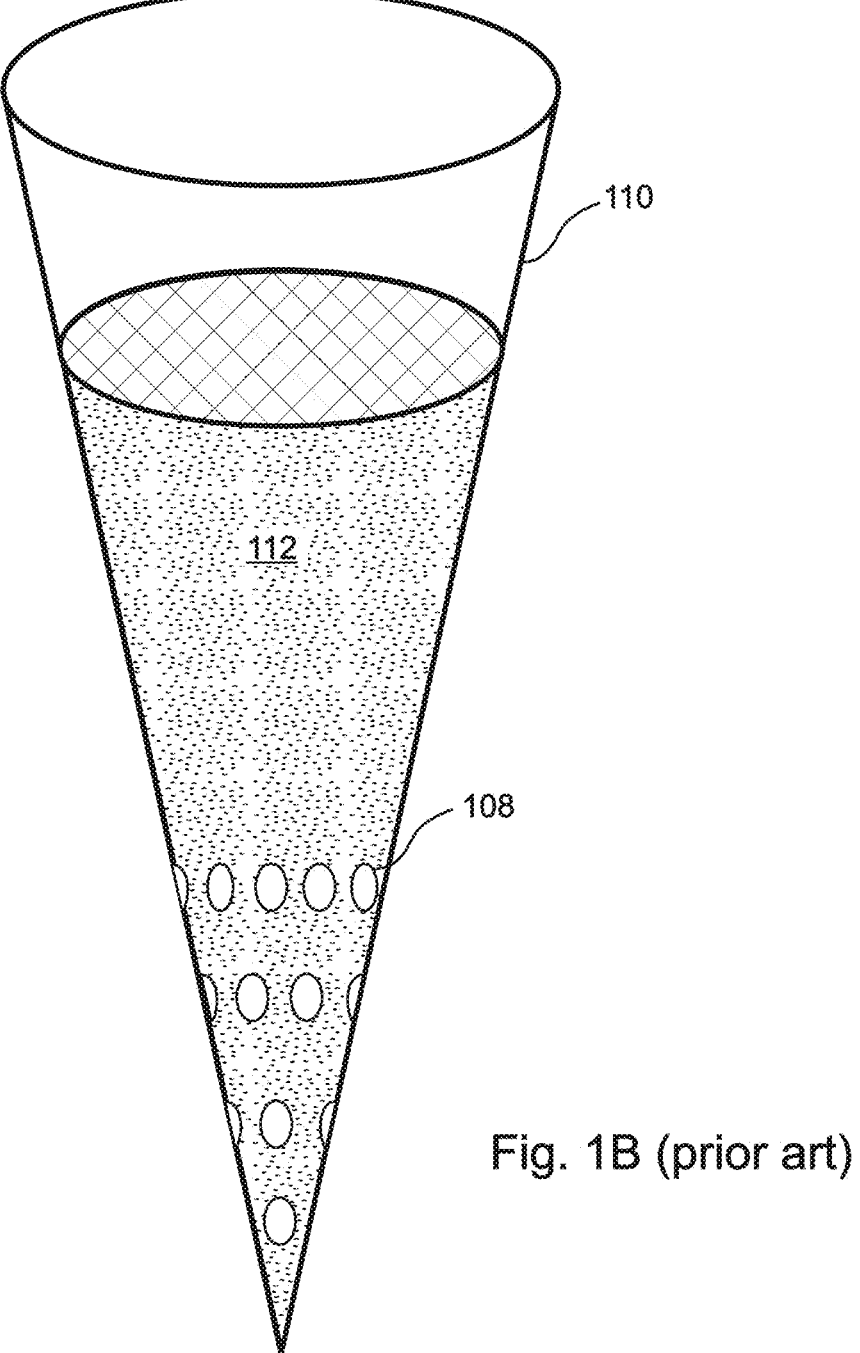
FIG. 1B is a perspective view of seeds contained together with soil and nutrients within a tampered container according to the prior art.
Figure 1C:
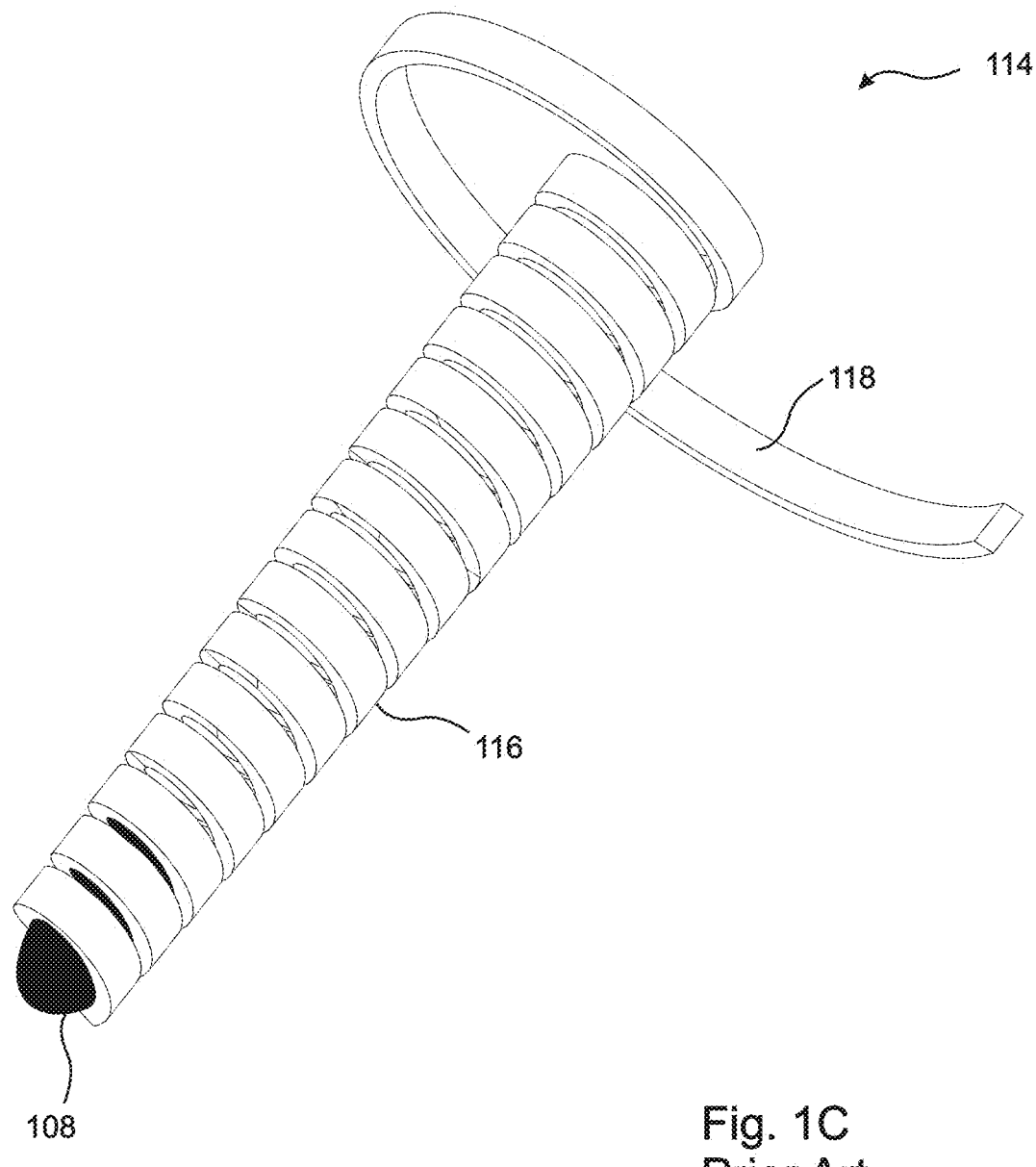
FIG. 1C is a perspective view of a self-drilling seed carrier of the prior art comprising a single helix shown in its dehydrated state.
Figures 1D, 1E:
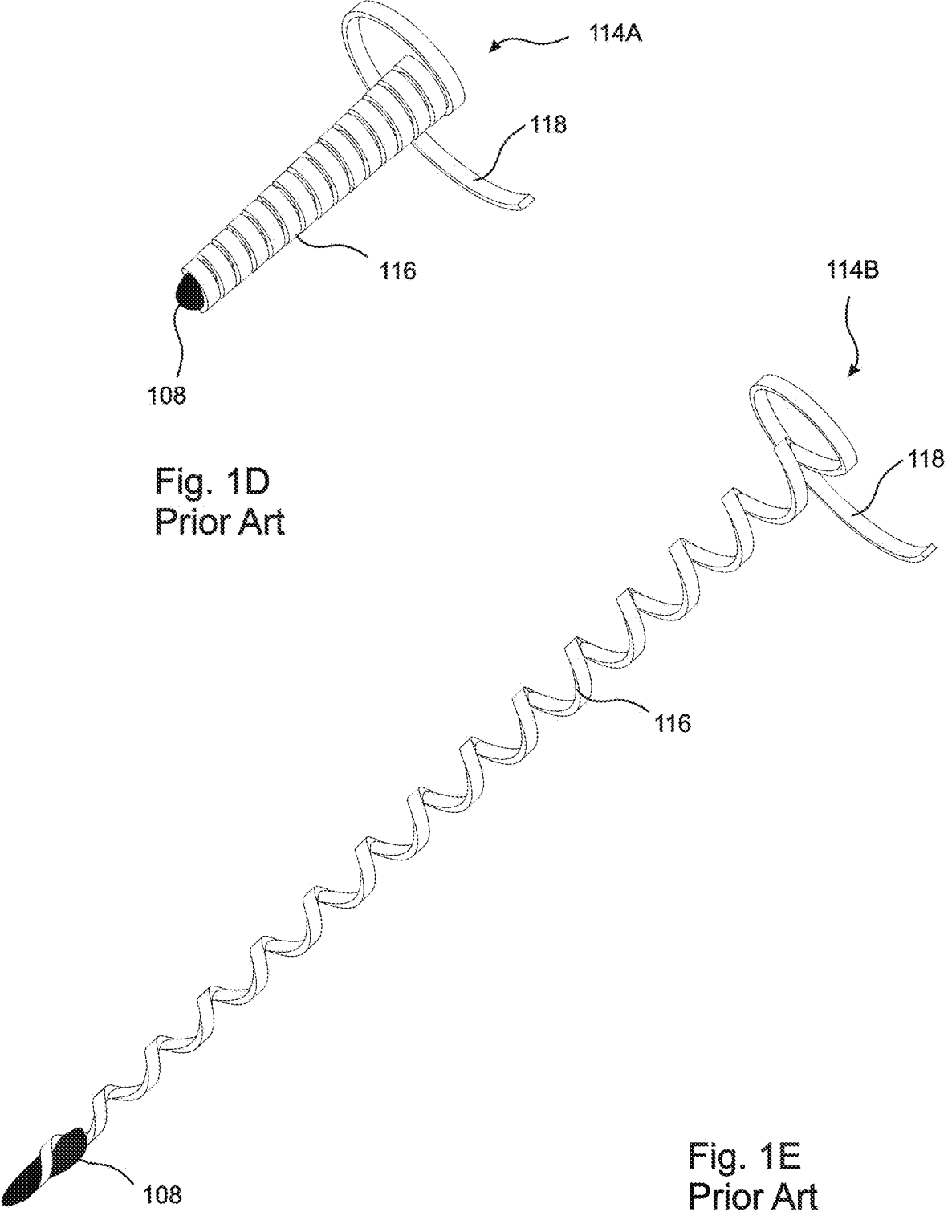
FIG. 1D is a smaller rendering o FIG. 1C for comparison purposes.
FIG. 1E is a perspective view of the seed carrier of FIG. 1D shown after exposure thereof to moisture.
Figure 1F:
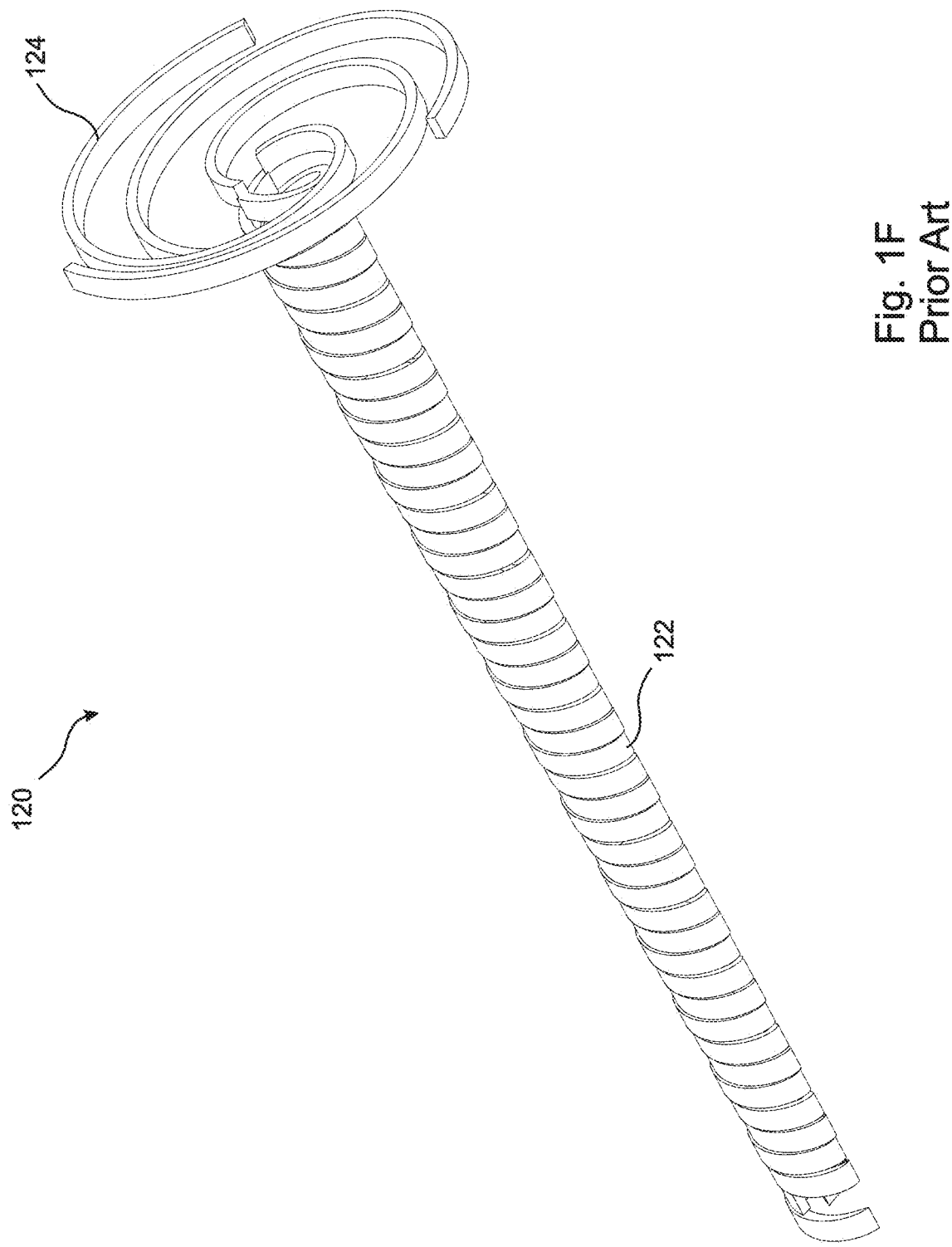
FIG. 1F is a perspective view of a self-drilling seed carrier of the prior art comprising a triple helix shown in its dehydrated state.
Figures 1G, 1H:
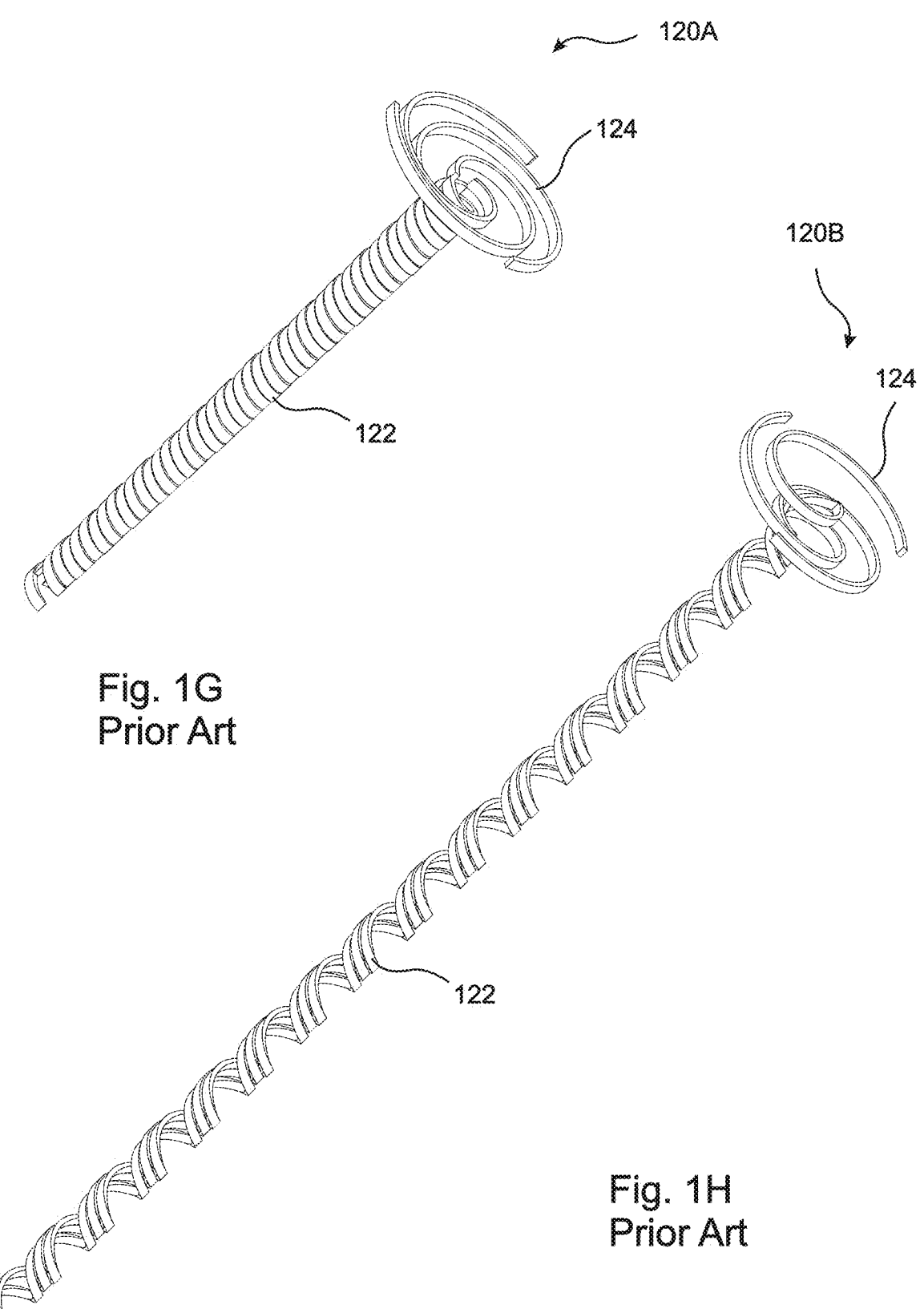
FIG. 1G is a smaller rendering o FIG. 1F for comparison purposes.
FIG. 1H is a side perspective view of the seed carrier of FIG. 1G shown after exposure thereof to moisture.
Figure 2A:
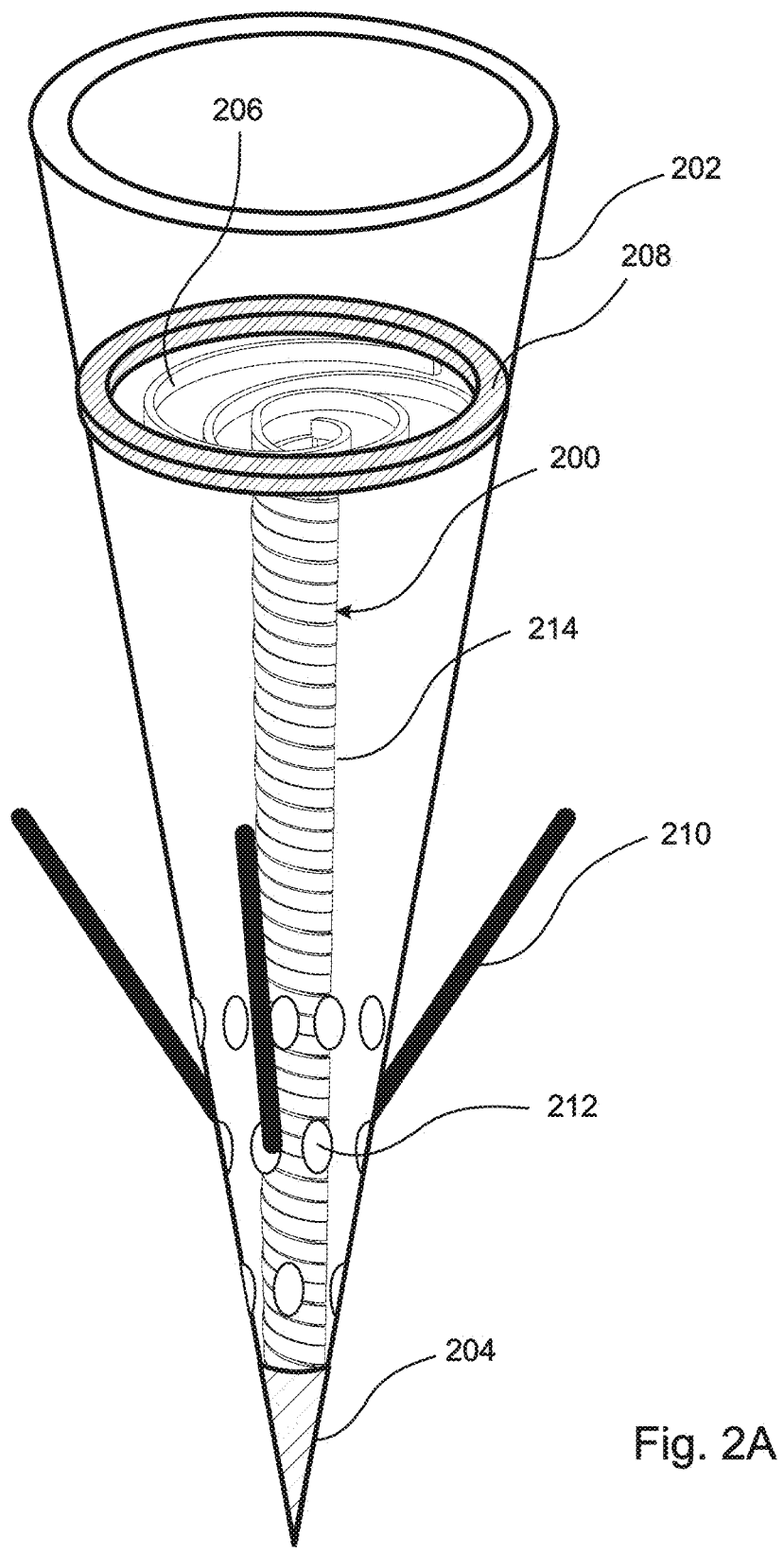
FIG. 2A is a side perspective view of an embodiment of the present invention in which the tapered projectile is conical.

With reference to the perspective side view of FIG. 2A, a self-drilling seed carrier 200 comprising a dehydrated and tightly wound helix 214 is positioned within a tapered projectile 202 having a tip that is either open, or terminated by a water-soluble, pointed cap 204. If a water-soluble, pointed cap 204 is included, it can be made, for example, from carbon nano-tube reinforced poly-vinyl alcohol, and/or fiberglass reinforced acrylic. In some embodiments, the tapered projectile 202 is made from a biodegradable material, such as coir, thereby minimizing any long-term impact on the environment. Note that the wall of the tapered projectile 202 has been rendered transparent, so that the interior contents can be seen.

The top 206 of the seed carrier 200 is either fixed to the tapered projectile 202, or otherwise prevented by internal structure from moving upward within the tapered projectile 202. In the illustrated embodiment, a containing ring 208 is threaded or otherwise fixed to the tapered projectile 202 immediately above a spiral top 206 of the seed carrier 200, thereby preventing the spiral top 206 from being pushed upward within the tapered projectile 202.

Figure 3:
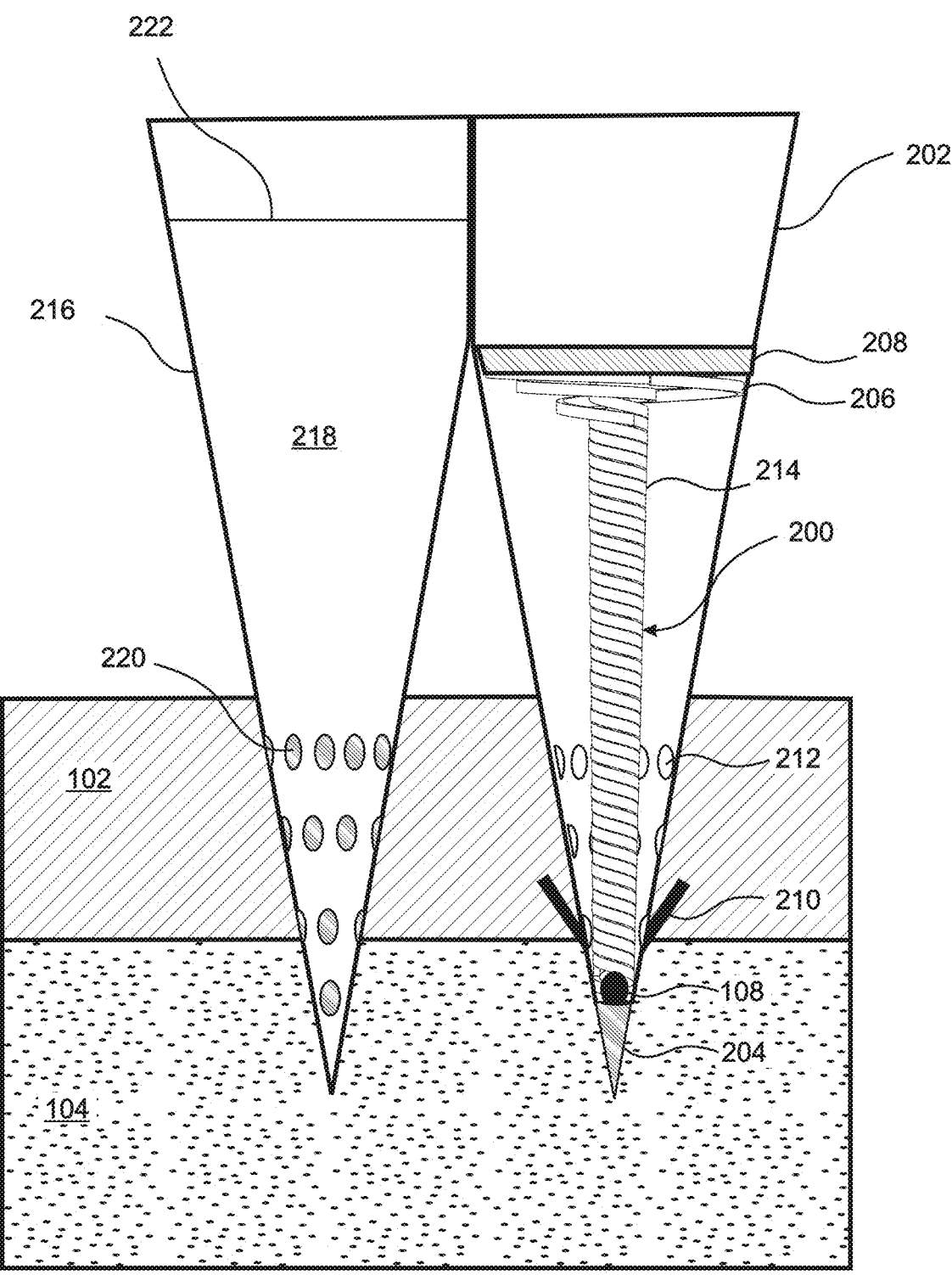
FIG. 3 is a side view of a cluster comprising a seeding tapered projectile directly bonded to a hydrating tapered projectile, wherein the projectiles are shown penetrating through a hydrophobic layer of underlying ground immediately after impact therewith, according to an embodiment of the present invention.

In the embodiment of FIG. 2A the tapered projectile 202 comprises a plurality of anchor barbs 210 that extend outward from the tapered projectile 202 near its tip 204, and resist being pushed upward once they have penetrated into the ground, as shown in FIG. 3. In some embodiments, the anchor barbs 210 are separate elements that are attached to the side of the tapered projectile 202, or extend outward from within through holes provided in the side of the tapered projectile 202. In still other embodiments, the anchor barbs 210 are strips of tapered projectile material that are cut out of the side of the tapered projectile 202 and bent outward, thereby providing both hydration holes 212 and the barbs 210.

While the top 206 of the seed carrier 200 is illustrated and sometimes referred to herein as being a "spiral," it will be understood that the functionality of the seed carrier 200 arises primarily from its helix 214, and not from its top 206, and that the top 206 of the seed carrier 200 can be an annulus, a disk, or any other construction that can be restrained from moving upward through the tapered projectile 202.

Figure 2B:
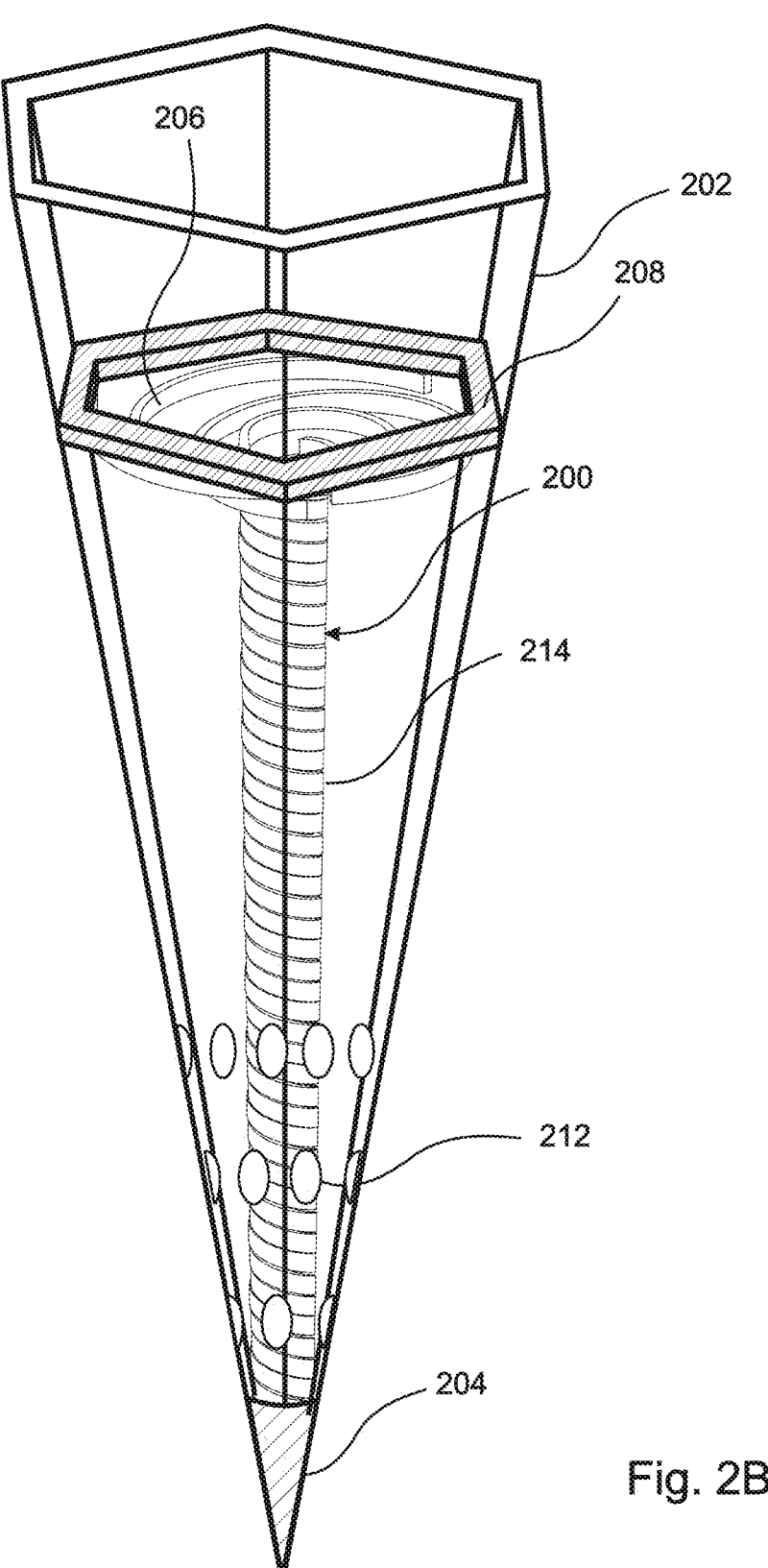
FIG. 2B is a side perspective view of an embodiment of the present invention in which the tapered projectile is hexagonal.

In the embodiment of FIG. 2A, the tapered projectile 202 is a cone. However, it will be understood that the tapered projectile 202 can take on any tapered shape, such as an inverted pyramid or hexagonal shape, and need not be conical. For example, in the embodiment of FIG. 2B, the cross-sectional shape of the tapered container 202 is a hexagon. In embodiments, the cross-sectional shapes of one or more of the tapered containers is not uniform along the length of the container, as shown for example in FIGS. 2C and 2E.

Embodiments provide various mechanisms for hydration of the helix 214 within the tapered projectile 202 once it is anchored in the ground 102, 104. In some embodiments, water enters the tapered projectile 202 through an open top thereof. In other embodiments, the tapered projectile 202 includes side openings 212 through which ground water can easily penetrate into the tapered projectile 202. As is discussed in more detail below with reference to FIG. 6, certain embodiments include a reservoir of water that is preinstalled in the tapered projectile 202 and enclosed within a hydration frangible container that releases its contents onto the seed carrier 200 upon impact of the tapered projectile 202 with the ground 102, 104.

Figure 2C:
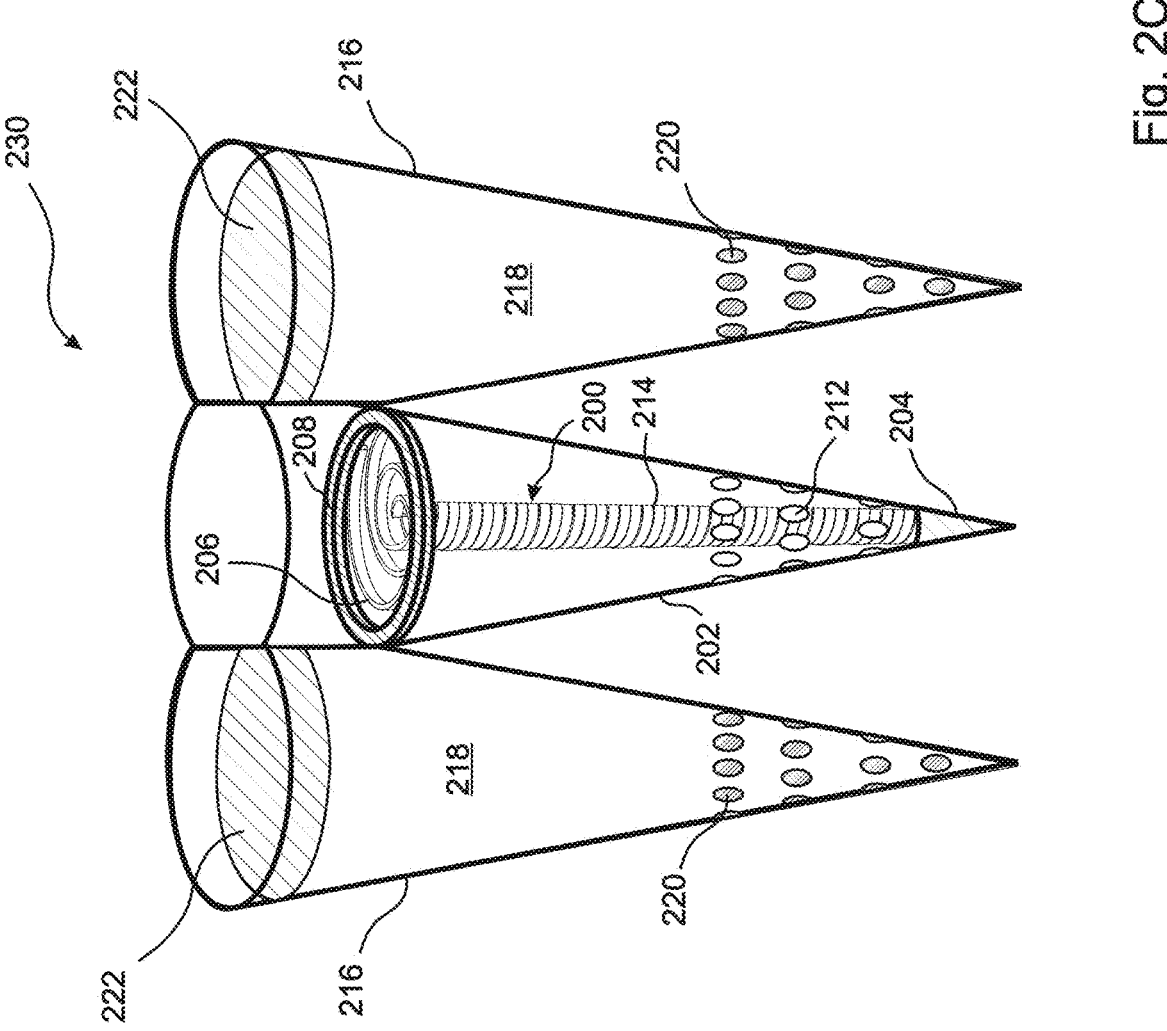
FIG. 2C is a side perspective view of a seeding cluster that comprises a seeding tapered projectile directly bonded and symmetrically located between two hydrating tapered projectiles according to an embodiment of the present invention.

With reference to FIG. 2C, in embodiments the tapered projectile 202 is a tapered "seeding" projectile 202 that is included in a cluster 230 together with one or more tapered "hydrating projectiles 216, wherein each of the hydrating projectiles 216 is filled primarily with water 218, either as a liquid, as shown in FIG. 2C, and/or incorporated into a super-absorbent polymer "SAP" that is carried by the hydrating projectile 216.

The hydrating projectiles 216 do not carry soil, seeds, or seedlings, but may carry fertilizer, either dissolved in the water 218 or separately. Upon impact, all of the tapered projectiles 202, 216 penetrate into the ground 102, 104 including, if present, through the hygroscopic layer 102. Water 218 is then released from the hydrating projectiles 216, thereby providing moisture for the one or more seeds or seedlings to germinate as they are projected downward from the seeding projectile 202 by the seed carrier 200. This approach ensures that the seeds or seedlings 108 are able to germinate and stabilize the ground even during periods of low rainfall, so that mudslides are less likely to result from any heavy and sudden rainfalls that subsequently occur.

In the embodiment of FIG. 2C the seeding tapered container 216 is sandwiched between two hydrating projectiles 216. The hydrating projectiles 216 in this embodiment contain liquid water 218. Holes 220 are provided proximate the tips of the hydrating containers 216. Before deployment of the cluster 230, the holes 220 are sealed by a water-soluble covering, which, for example, can be a layer of gelatin. The tops of the hydrating containers 216 are sealed by water-impermeable covers 222.

Figure 2D:
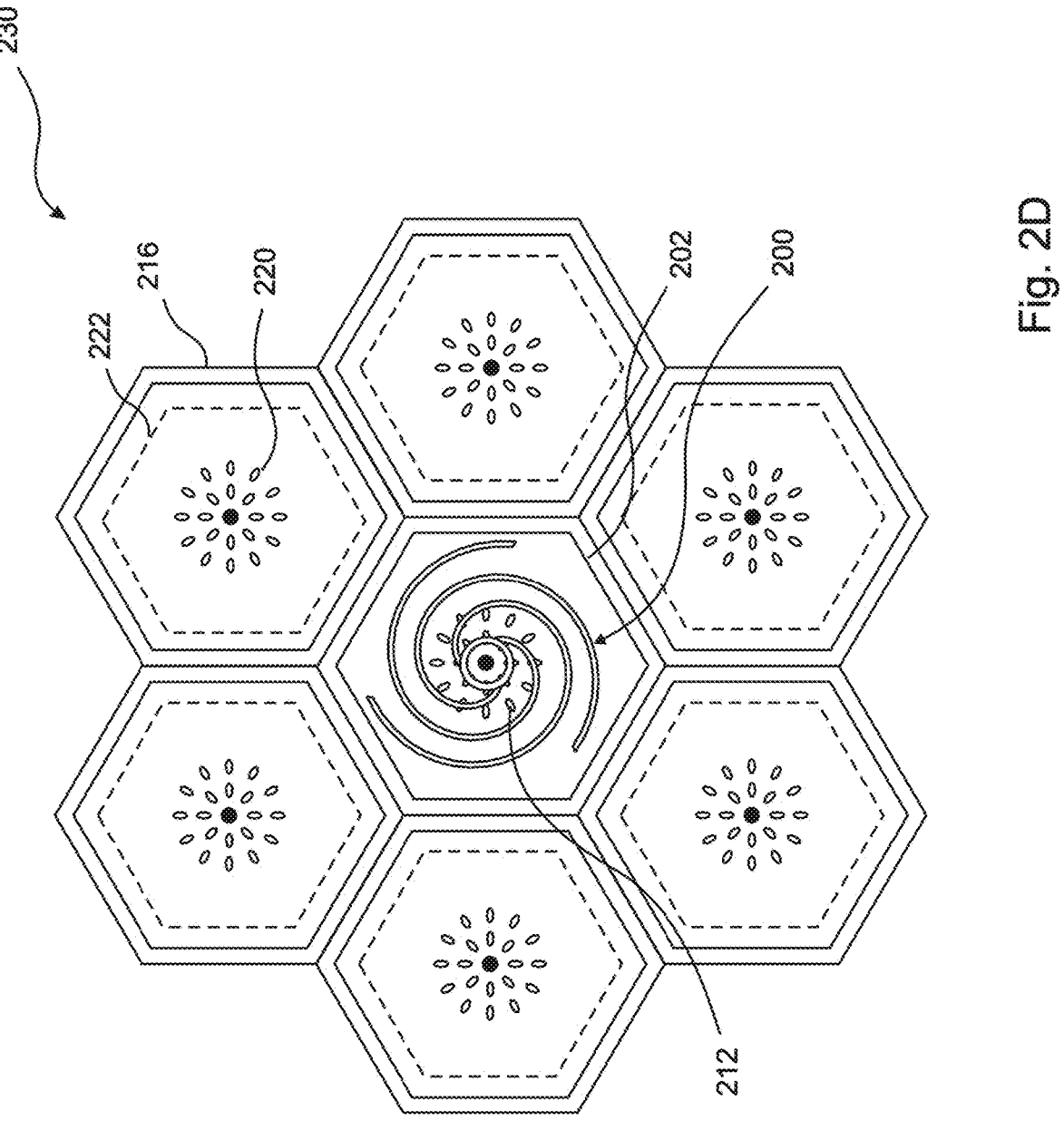
FIG. 2D is a top view of a seeding cluster that comprises a central hexagonal seeding tapered projectile bonded to and symmetrically surrounded by six hexagonal hydrating tapered projectiles according to an embodiment of the present invention.
Figure 2E:
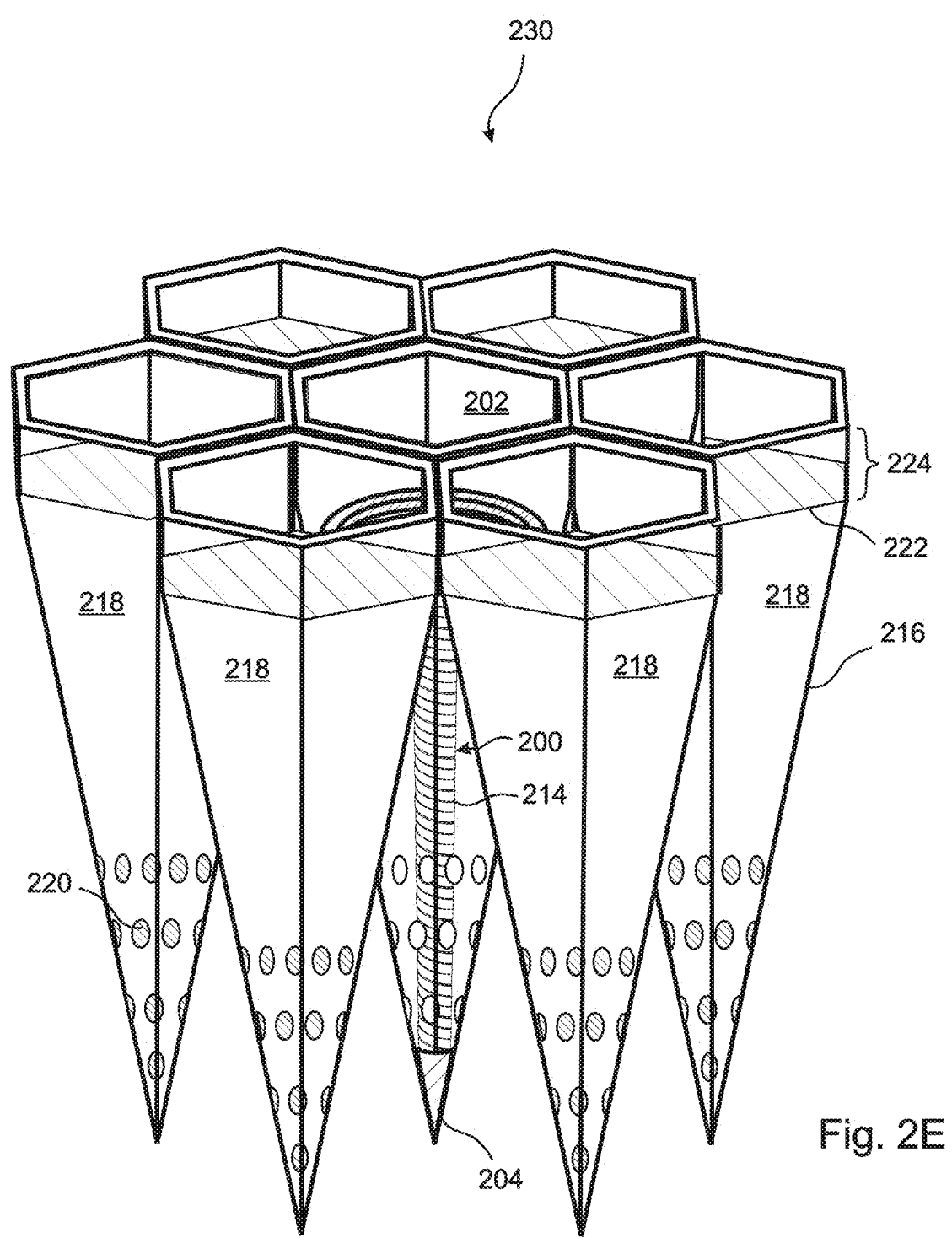
FIG. 2E is a side perspective view of the embodiment of FIG. 2D.

FIG. 2D is a top view of an embodiment in which the projectile cluster 230 includes a seeding tapered projectile 202 that is hexagonal in cross-section, and is surrounded by six hydrating projectiles 216. FIG. 2E is a perspective side view of the embodiment of FIG. 2D. It can be seen that in this embodiment there is an "attachment" portion 224 at the top of each projectile 202, 216 where the cross-sectional, hexagonal shape does not taper. This allows the attachment portions to abut each other and be directly bonded to each other in the cluster 230.

Figure 2F:
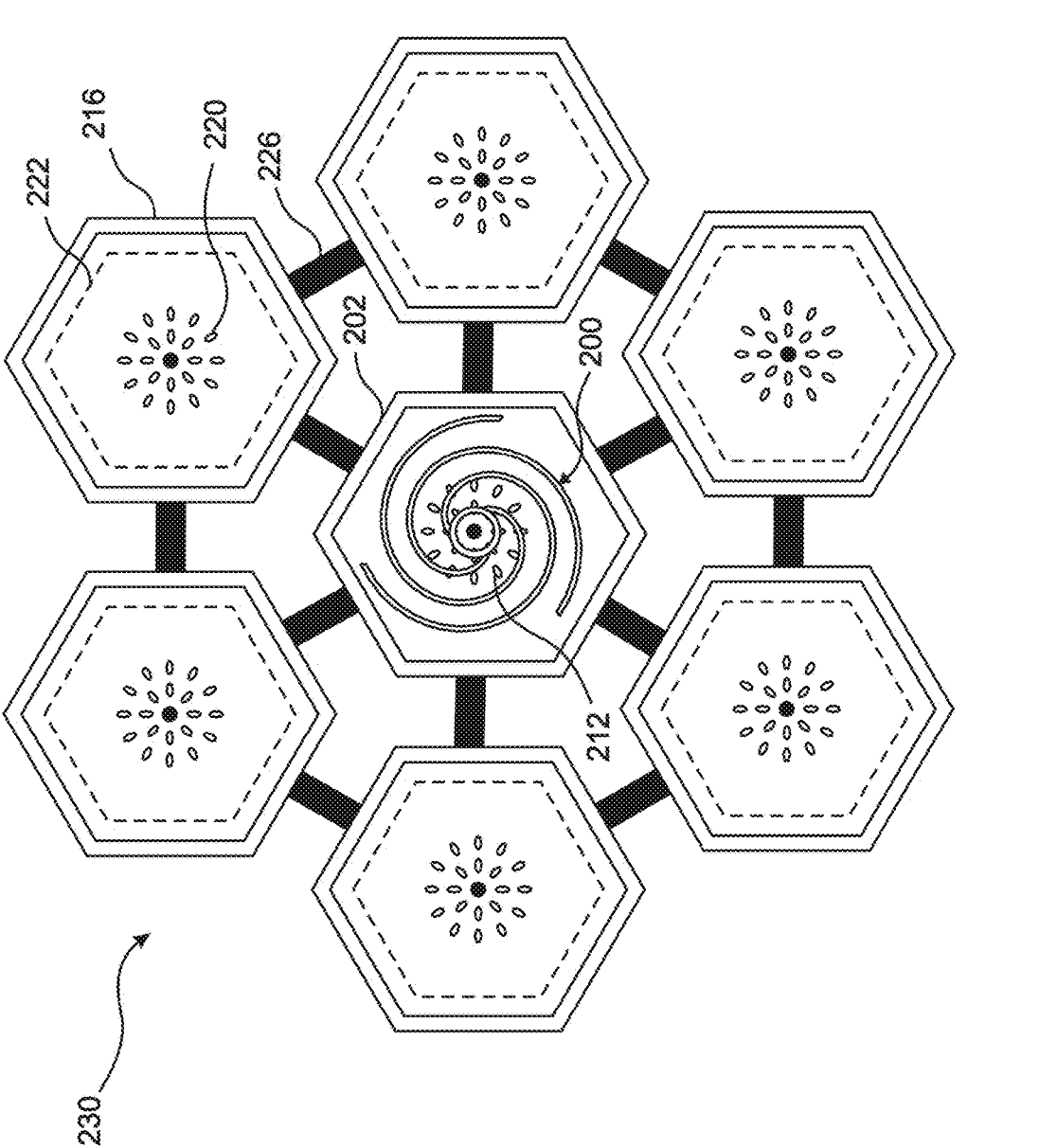
FIG. 2F is a top view of a seeding cluster that comprises a central hexagonal seeding tapered projectile bonded by struts to six hexagonal hydrating tapered projectiles that symmetrically surround the seeding tapered projectile according to an embodiment of the present invention.

In the embodiments of FIGS. 2C-2E, the tapered projectiles in the clusters 230 are directly attached to each other. FIG. 2F is a top view similar to FIG. 2D of an embodiment in which the tapered projectiles 202, 216 of the cluster 230 are attached to each other by "struts" 226 which separate the tapered projectiles 202, 216 from each other, and thereby reduce the air resistance of the cluster 230.

With reference to the sectional view of FIG. 3, the seeding tapered projectile 202, together with any hydrating tapered projectiles 216 that accompany the seeding tapered projectile 202, impact the ground 102, 104 in a substantially vertical orientation, and penetrate into the underlying surface 102 sufficiently far to anchor the tapered projectile 202 to the ground 102, 104, such that it remains vertical. A "pilot hole" is thereby provided for the seed carrier 200, even if the ground 102, 104 is hard-packed or otherwise difficult to penetrate. If a hydrophobic layer 102 is present, the projectiles 202, 216 penetrate through the hydrophobic layer 102 into the underlying soil 104. In the illustrated embodiment, the seeding tapered projectile 202 includes a water-soluble cap 204 which, upon dissolving, provides an opening through which the helix 214 of the self-drilling seed carrier 200 can extend upon exposure to moisture.

Figure 4:
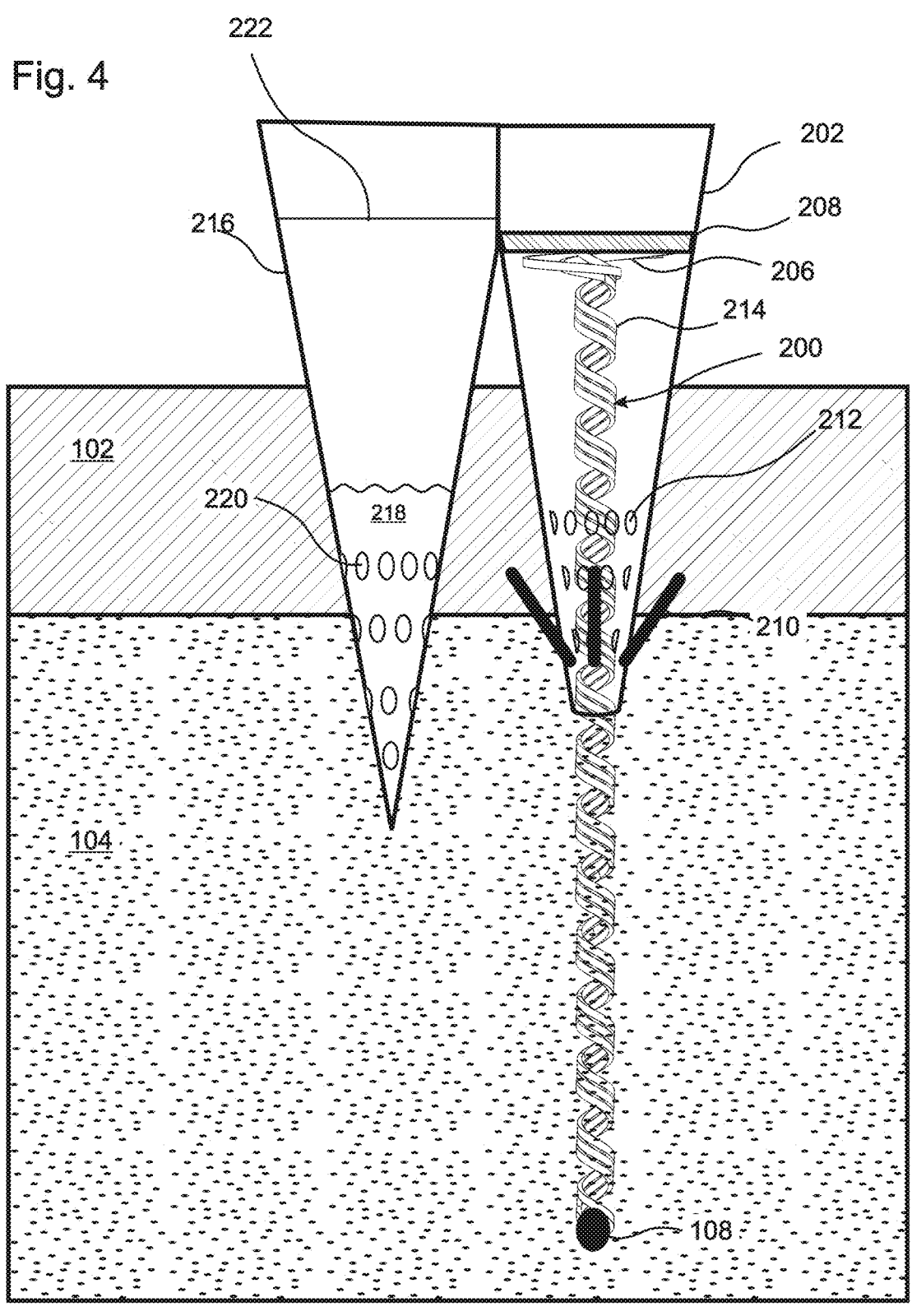
FIG. 4 is a side view of the embodiment of FIG. 3 shown after exposure of the seed carrier helix to moisture.

With reference to FIG. 4, as the seed carrier 200 within the interior of the seeding tapered projectile 202 is exposed to the water 218 released by the hydrating tapered projectile 216, and the pointed cap 204 (if present) at the bottom of the tapered projectile is dissolved, the helix 214 of the seed carrier 200 expands, twisting and drilling itself further and deeper into the underlying layers 102, 104. It will be noted that, in the example of FIG. 3, the tapered projectiles 202, 216 have penetrated entirely through the hydrophobic layer 102, allowing the helix 214 and the seed 108 attached thereto, as well as the water 218 carried by the hydrating tapered projectile 216, to penetrate into the underlying soil 104.

Figure 5:
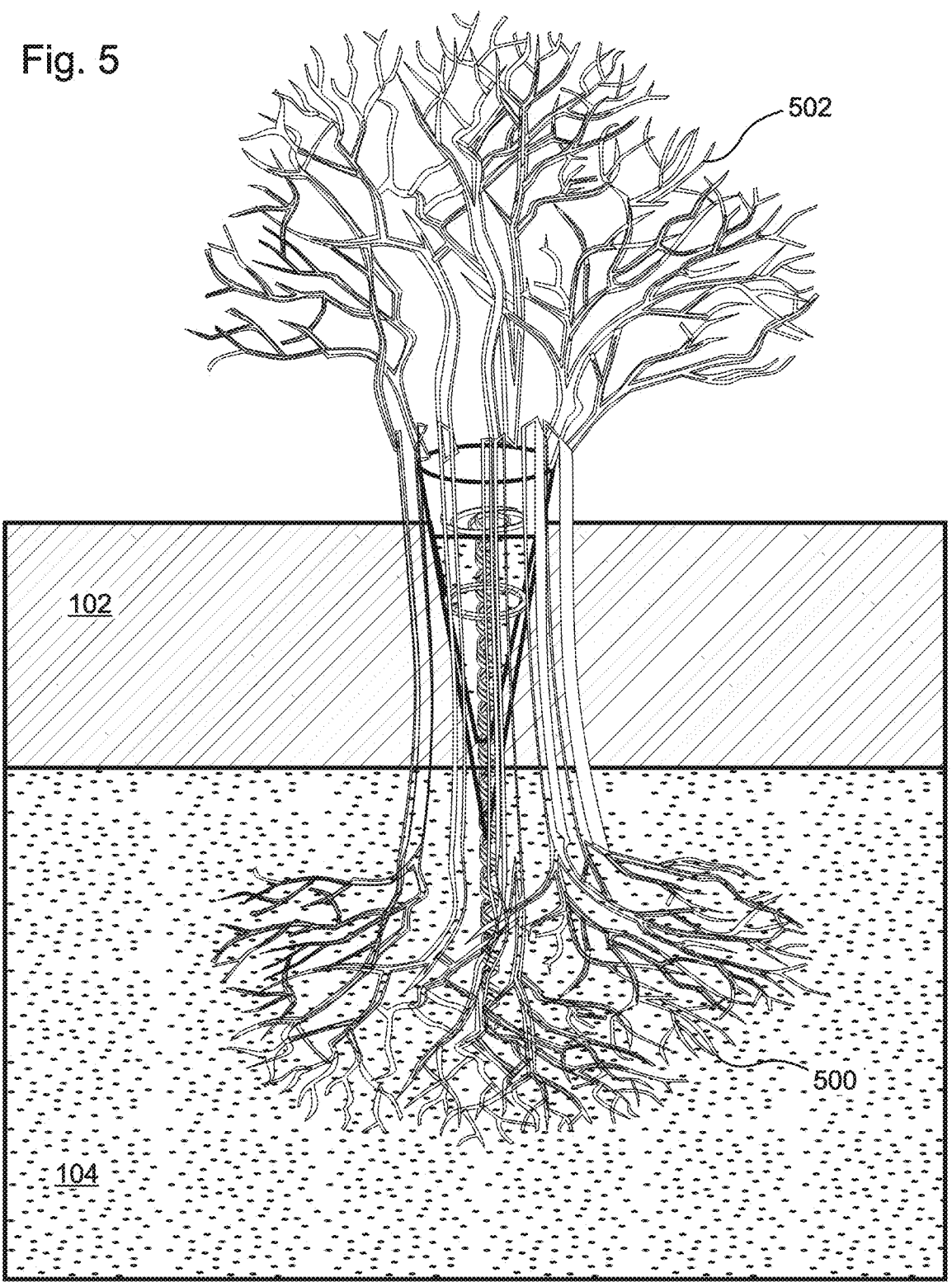
FIG. 5 is a side view of vegetation that has germinated from the seed of FIG. 4 and grown upward to become new vegetation.

As a result, with reference to FIG. 5, the seed 108 is able to germinate in the undamaged lower soil 104, where it establishes a root system 500 that enables the new vegetation 502 to grow upward, breaking through the hydrophobic layer 102. Initially, the tapered projectile 202 may be surrounded by the growing vegetation 502, as shown in the figure. However, in embodiments where the tapered projectile 202 and/or the hydrating projectiles 216, are made from a biodegradable material, such as coir, they will eventually break down and be absorbed into the vegetation 502, and/or will generally be incorporated into the environment. Similarly, in embodiments, the self-burying seed carrier 200 will be made from white oak, or from a similar biodegradable material, and will eventually be absorbed without harm to the environment. In the illustrated embodiment, the hydrating tapered projectile 216 was made from biodegradable materials, so that after releasing its water 218, it has been absorbed into the soil 102, 104.

Figure 6:
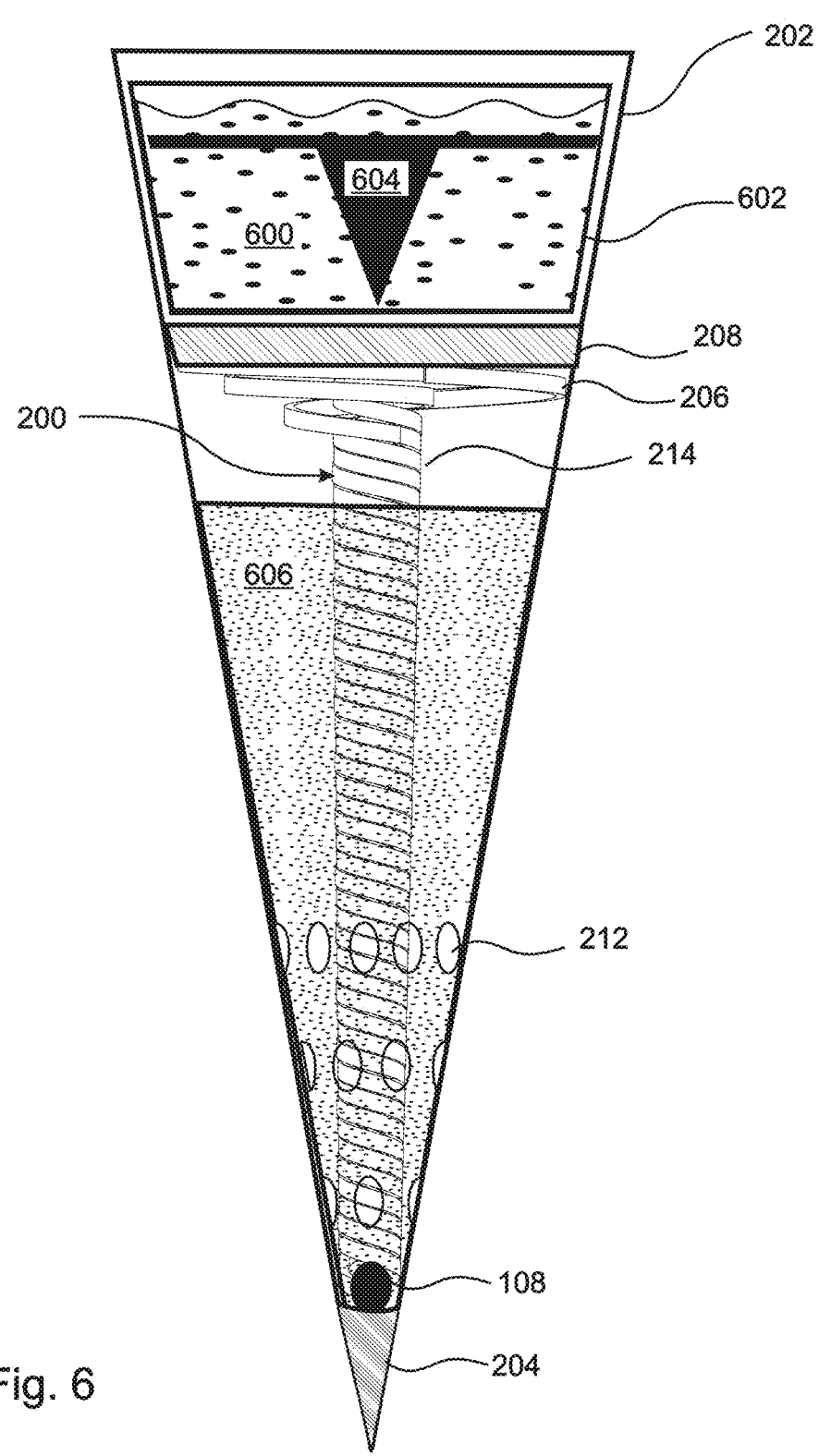
FIG. 6 is a side view of a seeding tapered projectile that includes water in a frangible hydration container within the tapered projectile according to an embodiment of the present invention.

With reference to FIG. 6, the seeding tapered projectiles 202 in embodiments of the present invention include a reservoir of water 600 that is preinstalled in the tapered projectile 202 and enclosed within a frangible hydration container 602, such as a thin-walled glass container, that releases its contents onto the seed carrier 200 upon impact of the tapered projectile 202 with the ground 102, 104. In some of these embodiments, the frangible container is broken simply by the shock of the impact of the tapered projectile 202 with the ground. In the illustrated embodiment, a weighted and pointed "hammer" 604 is included within the hydration container 602, and is configured to strike and break the bottom wall of the frangible hydration container 602 upon the impact of the tapered projectile 202 with the ground.

As is also illustrated in FIG. 6, the seeding tapered projectiles 202 in embodiments of the present invention include nutrients, soil, sand, gravel, and/or fertilizer 606 within the tapered projectile 202 surrounding the helix 214, which are absorbed into the surrounding soil upon exposure to water, and thereby support the germination of the seed 108. In various embodiments, a super-absorbent polymer (SAP) is included in the tapered projectile 202 surrounding the helix 214, either alone or together with the nutrients and/or fertilizer 606. The SAP absorbs water when it is abundant within the tapered projectile 202, such as after a heavy rain, a flood, and/or release of water 600 from an internal reservoir container 602 (if present). The SAP then slowly releases the water over time when it is needed, thereby ensuring a continued application of water as the helix 200 unwinds, and then as the seed 108 germinates and grows. Similarly, in some embodiments that include hydrating tapered projectiles 216, the hydrating tapered projectiles 216 contain SAP and/or fertilizer. When included in a hydrating tapered projectile 216, the SAP causes the water 218 from the hydrating tapered projectile 216 to be released gradually into the surrounding soil 104, rather than being released all at once.

Figure 7:
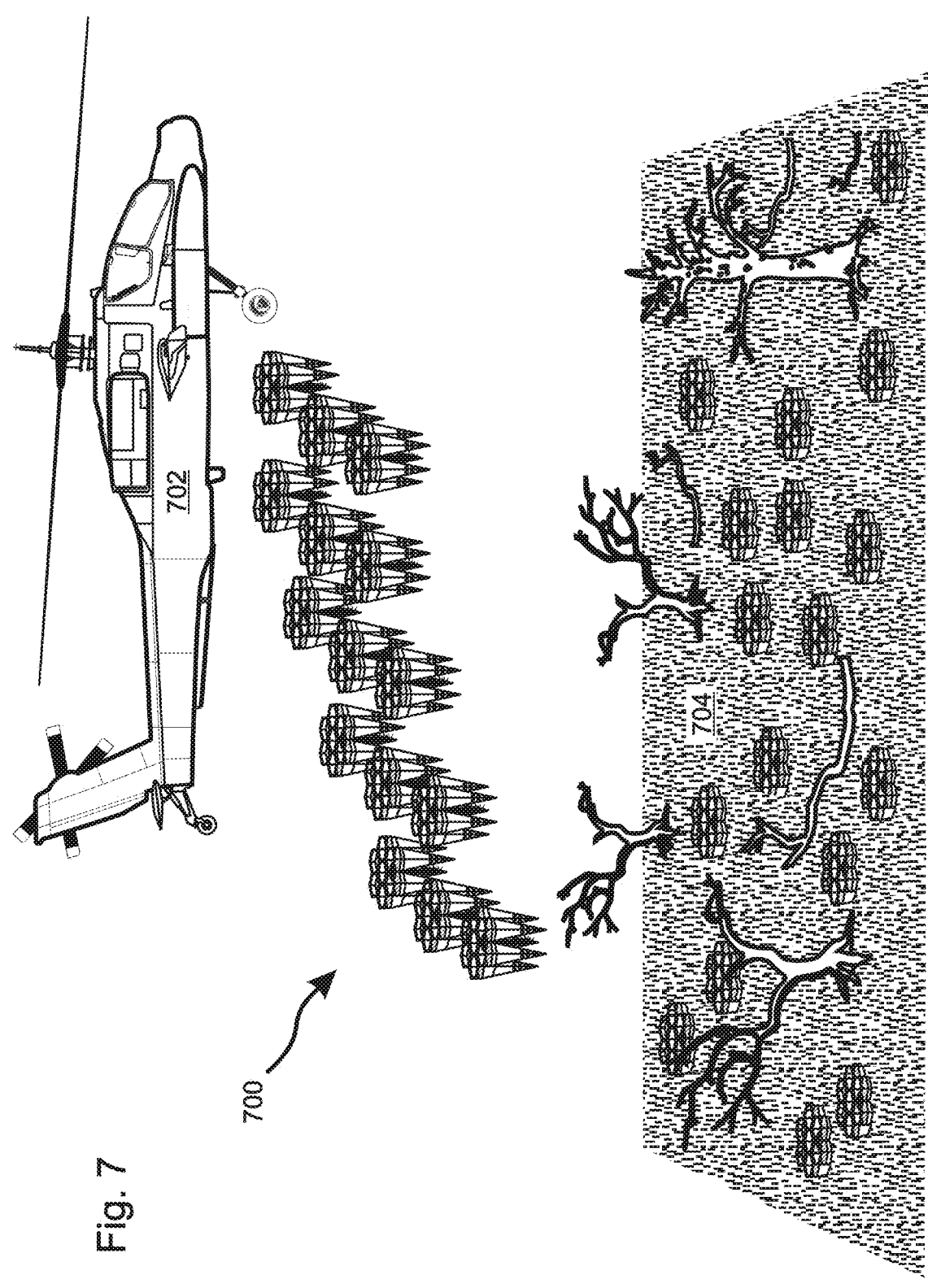
FIG. 7 illustrates a helicopter dropping, or ballistically propelling, a plurality of the disclosed seed planting clusters onto a damaged, remote area, according to a method embodiment of the present invention.

With reference to FIG. 7, the disclosed method of establishing new vegetation in a distressed, remote area 704 includes dropping, or ballistically propelling, from the air onto the remote area 704 a plurality 700 of seeding tapered projectiles 202 containing self-burying seed carriers 200, as disclosed herein. In FIG. 7, the seeding tapered projectiles 202 are included in clusters 230 together with hydrating tapered projectiles 216.

The tapered projectiles 202 can be dropped from any convenient aircraft, such as from one or more drones, balloons, airplanes, or, as illustrated in FIG. 7, by a helicopter 702. In some embodiments, the impact energy of the tapered projectiles 202 with the ground is derived entirely from gravitational acceleration, while in other embodiments the impact energy is augmented by ballistic propulsion that can be applied, for example, by at least one of a compressed gas and a chemical explosive. In embodiments, if the remote area 704 has experienced a forest fire, the tapered projectiles 202 are dropped from a sufficient height, and/or ballistically propelled with sufficient force, to cause the tapered projectiles 700 to penetrate through any hydrophobic layer 102 that may have formed on top of the underlying soil 104.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. A seed planting cluster comprising:

a hollow seeding tapered projectile having a top, a bottom, and a side, wherein a horizontal, cross-sectional area of the top is larger than a horizontal, cross-sectional area of the bottom;

a seed carrier positioned within an interior of the seeding tapered projectile, the seed carrier comprising a helix extending downward from a carrier top of the seed carrier, the helix being substantially aligned with a seeding axis of the seeding tapered projectile, the helix being made from a material that expands when exposed to water, thereby at least partially unwinding the helix and increasing a length thereof;

one or more seeds, seedlings, and/or saplings contained within the tapered projectile and fixed to, or within, a lower portion of the helix;

a hollow hydrating tapered projectile fixed to the seeding tapered projectile, a horizontal, cross-sectional area of a top of the hydrating tapered projectile being larger than a horizontal, cross-sectional area of a bottom of the hydrating tapered projectile;

hydrating water contained within a hydrating interior of the hydrating tapered projectile; and at least one hydrating hole proximate a bottom of the hydrating tapered projectile, the hydrating hole being covered by a water-soluble or frangible hydrating hole cover that is configured to be dissolved or ruptured after impact of the hydrating tapered projectile with underlying ground, thereby allowing the hydrating water to enter into the underlying ground that surrounds the hydrating tapered projectile;

the seed planting cluster being configured such that, upon an impact of the tapered projectiles with the underlying ground, the bottoms of the tapered projectiles are inserted into the ground, and the helix within the seeding tapered projectile is exposed to moisture released by the hydrating tapered projectile, thereby causing the length of the helix to be increased, such that the helix extends downward through the bottom of the seeding tapered projectile, and the one or more seeds, seedlings, and/or saplings are inserted into soil beneath the seeding tapered projectile.

2. The seed planting cluster of claim 1, wherein the hydrating tapered projectile is directed bonded to the seeding tapered projectile.

3. The seed planting cluster of claim 1, wherein the hydrating tapered projectile is bonded to the seeding tapered projectile by a strut.

4. The seed planting cluster of claim 1, wherein the hydrating tapered projectile further contains fertilizer.

5. The seed planting cluster of claim 1, wherein at least some of the water that is contained within the hydrating tapered projectile is absorbed into a super-absorbent polymer (SAP).

6. The seed planting cluster of claim 1, wherein the hydrating hole cover comprises gelatin.

7. The seed planting cluster of claim 1, wherein the hydrating tapered projectile is included in a plurality of hydrating tapered projectiles, the seeding tapered projectile being symmetrically centered among the plurality of hydrating tapered containers.

8. The seed planting cluster of claim 1, wherein the tapered projectile is shaped as a cone, or as a frustum of a cone.

9. The seed planting cluster of claim 1, wherein the bottom of the seeding tapered projectile comprises a downward-facing opening through which the helix is able to extend as its length is increased.

10. The seed planting cluster of claim 1, wherein the bottom of the seeding tapered projectile is a downwardly directed cap made from a water-soluble material.

11. The seed planting cluster of claim 1, wherein the seeding tapered projectile comprises at least one opening that penetrates the side of the seeding tapered projectile, thereby enabling moisture proximate the side of the seeding tapered projectile to enter into the interior of the seeding tapered projectile.

12. The seed planting cluster of claim 1, wherein the seeding tapered projectile further comprises water enclosed within a hydration container within the interior of the seeding tapered projectile, the hydration container being configured to release the water onto the helix upon impact of the seeding tapered projectile with the ground.

13. The seed planting cluster of claim 12, wherein the hydration container is frangible, and configured to be broken open upon impact of the seeding tapered projectile with the ground.

14. The seed planting cluster of claim 13, wherein the seeding tapered projectile further comprises a hammer configured to strike and break open the hydration container upon impact of the seeding tapered projectile with the ground.

15. The seed planting cluster of claim 1, further comprising at least one anchor extending outward from the seeding tapered projectile, the anchor being configured to readily penetrate into the ground, and thereafter to resist any upward dislodging of the seeding tapered projectile from the ground.

16. The seed planting cluster of claim 1, further comprising at least one of nutrients, soil, sand, gravel, fertilizer, and super-absorbent polymer (SAP) within the interior of the seeding tapered projectile.

17. A method of aerially applying seeds and/or seedlings to ground within a terrain, the method comprising:

providing a seed planting cluster according to claim 1; and dropping or propelling the seed planting cluster from an aircraft toward the underlying ground, such that:

the bottoms of the seeding tapered projectile and the hydrating tapered projectile impact the ground according to an impact energy;

the bottoms of the seeding tapered projectile and the hydrating tapered projectile penetrate into the underlying ground;

the hydrating water contained within the hydrating tapered projectile is released into the underlying ground;

the helix of the seed carrier positioned within the seeding tapered projectile is exposed to the hydrating water;

the length of the helix is increased;

the helix extends downward through the bottom of the seeding tapered projectile; and the one or more seeds, seedlings, and/or saplings that are fixed to or within a lower portion of the helix are inserted into soil beneath the seeding tapered projectile.

18. The method of claim 17, wherein the impact energy of the seed planting cluster is derived entirely from gravitational acceleration after being released from the aircraft.

19. The method of claim 17, wherein dropping or propelling the seed planting cluster from the aircraft comprises ballistically propelling the seed planting cluster from the aircraft toward the forest floor.

20. The method of claim 17, wherein the impact energy is sufficient to cause the seeding tapered projectile to penetrate a hydrophobic layer into underlying soil.

\* \* \* \* \*